(12) United States Patent
Gradu

(10) Patent No.: US 6,530,460 B2
(45) Date of Patent: Mar. 11, 2003

(54) FRONT-REAR AND SIDE TO SIDE TORQUE TRANSFER MODULE FOR ALL-WHEEL DRIVE VEHICLES

(75) Inventor: Mircea Gradu, Wooster, OH (US)

(73) Assignee: The Timken Company, Canton, OH (US)

(*) Notice: Subject to any disclaimer, the term of this patent is extended or adjusted under 35 U.S.C. 154(b) by 40 days.

(21) Appl. No.: 09/791,086

(22) Filed: Feb. 22, 2001

(65) Prior Publication Data

US 2002/0112932 A1 Aug. 22, 2002

(51) Int. Cl.⁷ .................. F16D 27/115; B60K 17/35
(52) U.S. Cl. ............. 192/35; 192/70.23; 192/84.7; 192/84.91
(58) Field of Search ................. 192/35, 12 A, 192/17 C, 54.5, 54.52, 70.23, 84.7, 84.91, 93 A; 180/247; 464/182

(56) References Cited

U.S. PATENT DOCUMENTS

| 1,604,925 A | * 10/1926 | MacDonald ............ 464/182 X |
| 2,738,045 A | 3/1956 | Mergen et al. |
| 5,007,498 A | * 4/1991 | Wiese et al. ................ 180/248 |
| 5,083,986 A | * 1/1992 | Teraoka et al. ............ 192/35 X |
| 5,322,484 A | * 6/1994 | Reuter ................... 192/21.5 X |
| 5,465,820 A | 11/1995 | Dick |
| 5,469,950 A | 11/1995 | Lundström et al. |
| 5,884,738 A | * 3/1999 | Joslin et al. ................. 192/35 |
| 5,911,291 A | * 6/1999 | Suetake et al. ............... 192/35 |
| 5,979,631 A | 11/1999 | Lundström |
| 6,098,770 A | 8/2000 | Isley, Jr. |
| 6,158,561 A | * 12/2000 | Sakai et al. ................... 192/35 |
| 6,247,566 B1 | * 6/2001 | Severinsson ................. 192/35 |

FOREIGN PATENT DOCUMENTS

| DE | 4312221 | 10/1994 |
| EP | 0995623 | 4/2000 |

OTHER PUBLICATIONS

M. Ohba, H. Suzuki, T. Yamamoto, H. Takuno—Development of a New Electronically Controlled 4WD System: Toyota Active Torque Control 4WD—Copyright © 1999 Society of Automotive Engineers, Inc. pp. 83–91.

* cited by examiner

Primary Examiner—Richard M. Lorence
(74) Attorney, Agent, or Firm—Polster, Lieder, Woodruff & Lucchesi

(57) ABSTRACT

A front or rear torque transfer module system for an all-wheel drive vehicle includes a housing containing two rotating shaft members connected by a clutch. The clutch is activated when a braking mechanism such as an electromagnetic, hysteresis or eddy current brake modulates the relative rotation between a clutch pressure plate and the second rotating shaft member. The difference in relative rotation forces two opposing ramped surfaces into opposition to induce the clutch pressure plate to compress a set of interleaved clutch discs thereby transferring rotational motion between the first rotating shaft member and the second rotating shaft member.

45 Claims, 2 Drawing Sheets

FRONT-REAR AND SIDE TO SIDE TORQUE TRANSFER MODULE FOR ALL-WHEEL DRIVE VEHICLES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Technical Field

This invention relates in general to a torque transfer module system and, more particularly, to a torque transfer module to transfer the torque between the front and rear axles or the left and right wheels of the same axle on all wheel drive vehicles or a vehicle having four wheel drive on demand.

The primary benefit of an all wheel drive vehicle is its ability to transfer engine torque to all of the wheels of the vehicle. This torque transfer allows the vehicle to retain mobility on surfaces where one or more wheels of the vehicle are unable to obtain traction. Various torque transfer devices are currently used to provide dynamic control to vehicles. Torque transfer is usually accomplished through use of a torque transfer module installed in the drive train of the vehicle. In some installations, the torque transfer module transfers torque from one axle to another axle on the vehicle. On other installations, the torque transfer module transfers torque between two wheels mounted onto a single axle of the vehicle. When one of the axles on the vehicle, or one of the wheels on a single axle, is unable to obtain traction, the torque transfer module shifts the torque from the slipping axle or wheel to the axle or wheel having better traction. Torque transfer between the wheels of the same axle can also be accomplished by using a conventional limited slip differential.

2. Description of Related Art

Early all wheel drive vehicles used a simple gear box arrangement wherein a locking device was used to mechanically connect one wheel of an axle to the other wheel. Through this mechanical locking connection, the same torque was transferred to both wheels regardless of whether either one of the two wheels was losing traction.

More recently, torque transfer systems have been invented to detect when one axle or one wheel is losing traction. The torque transfer systems then transfer torque from the slipping axle or wheel, to the axle or wheel with better traction. Several methods have been used to detect wheel slippage. The most commonly used systems utilize the signals generated from an antilock braking system installed onboard the vehicle.

U.S. Pat. No. 6,098,770 teaches a clutch assembly having a reaction force circuit which operates to control the amount of torque applied to each wheel. An internal clutch mechanism is engaged when an electrical solenoid is used to slow the rotation of a ramped plate (or circular element) in relation to another ramped plate (circular element) connected to the output shaft. The mechanical transfer of the torque is accomplished by a series of load bearing balls that ride up circular recess of one circular element, to press against a circular recess in another circular element causing the other element to engage the clutch plates in the clutch.

U.S. Pat. Nos. 5,469,950 and 5,979,631 describe another torque transmission device wherein the speed differential between two rotating shafts operates a hydraulic pump arrangement. The hydraulic pump pressurizes a clutch piston which drives an element against the internal clutch plates, thereby engaging the clutch. Cam followers are used to operate the hydraulic pump arrangement and to indicate a torque differential within the device. While the cam followers succeed in operating the hydraulic pump, the cam followers cause fluctuations in the hydraulic pump allowing pressure differentials in the compression of the clutch plates. These pressure differentials can result in increased wear in the clutch plate assembly.

The present invention offers a more compact design for a torque transfer system, optimized from the standpoint of axial length, number of components, efficiency, wear and deflections.

SUMMARY OF THE INVENTION

The present invention resides in a torque transfer module having an ability to vary the amount of torque transferred between a first rotating shaft member and a second rotating shaft member. Specifically, a clutch assembly positioned between a first rotating shaft member and a second rotating shaft member is partially or wholly engaged dependent upon the amount of electrical current applied to an electromagnetic braking/clutch mechanism such as a hysteresis or eddy current brake. The braking mechanism initiates a drag upon a ramped plate on the first rotating shaft member and forces it to apply pressure onto a ramped surface of a clutch pressure plate. The pressure placed upon the clutch pressure plate compresses the clutch discs of a clutch assembly to transfer the torque between the first rotating shaft member and the second rotating shaft member. The design of the pole structure of the electromagnetic brake/clutch is essential for the operation of the torque transfer module in a vehicle stand-still situation. When the electromagnetic clutch is energized, enough torque has to be generated in order to create a limited relative rotation between the ramped surfaces, resulting in compressing the clutch discs and causing torque transfer.

DESCRIPTION OF THE DRAWINGS

Corresponding reference numerals indicate corresponding parts throughout the several figures of the drawings.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
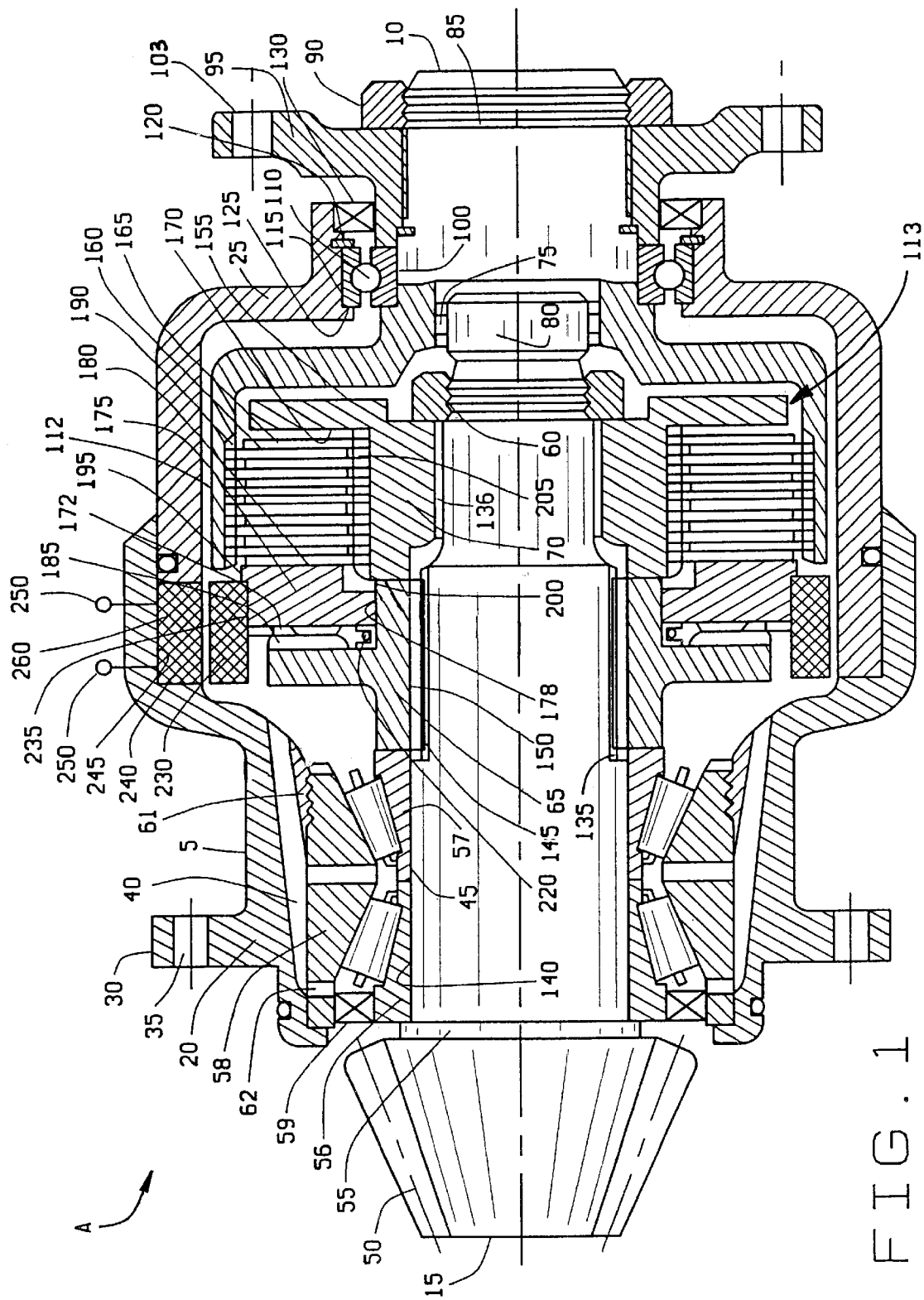
FIG. 1 is a one half longitudinal sectional view of a torque transfer module constructed in accordance with, and embodying, the present invention.

Referring now to FIG. 1, a torque transfer module A is shown. The torque transfer module A includes a housing 5, a first rotating shaft member 10, and a second rotating shaft member 15. The housing 5 consists of a flanged housing assembly 20 and a clutch housing assembly 25. A circular flange 30 on the flanged housing assembly 20 contains a plurality of axially spaced mounting holes 35 for attaching the torque transfer module A to other mechanisms of an all wheel drive, such as the vehicle's rear axle housing. The flanged housing assembly 20 contains a set of horizontal lubrication channels 40 and vertical lubrication channels 62 which are used to route lubricants into an antifriction bearing assembly 45.

The second rotating shaft member 15 has a first end, a second end, and an intermediate shaft. The first end of the second rotating shaft member 15 has a hypoid or beveled gear 50 capable of mating with a gear on the all wheel drive vehicle having a set of complimentarily configured gear teeth. Abutting the hypoid or bevel gear 50 is a shoulder 55. An inner race 56 and an inner race 57 of the antifriction bearing assembly 45 are biased against the shoulder 55 by a nut 60 which holds a ramped plate 65 and a clutch plate 70 into position on the second rotating shaft member 15. An outer race 58 is held in place within the flanged housing 20 by a set of threads 61 on the outer race 58. A seal 59 prevents contamination of the antifriction bearing assembly 45 and the internal components of the torque transfer module. The second end of the second rotating shaft member 15 is threaded to accept the retaining nut 60. The intermediate portion of the shaft 15 has a first plurality of external splines 135 and a second set of external splines 136. The ramped plate 65 is rotationally connected to the second rotating shaft member 15 by the first set of external splines 135, and a clutch plate 70 is rotationally connected to the second rotating shaft member 15 by the second set of external splines 136.

Near the second end of the second rotating shaft member 15, a bearing 75 is located on bearing surface 80 of the second rotating shaft member 15 to allow for relative rotation between the first rotating shaft member 10 and the second rotating shaft member 15.

The first rotating shaft member 10 has a first end and a second end, the second end having threads 85 which hold a retaining nut 90 onto the first rotating shaft member 10. The retaining nut 90 holds a circular mounting flange 95 and an inner race 100 of a bearing 110 onto the second rotating shaft member 15. The circular mounting flange 95 has a plurality of mounting holes 103 for attaching the mounting flange 95 to an axle or other rotating member of a vehicle, and an internally splined bore sized to slidably fit over the externally splined first end of the first rotating shaft member 10. An outer race 115 of the bearing assembly 110 is retained onto the flanged housing 25 by a retaining ring 120 and a shoulder 125 machined into the flanged housing 25. A seal 130 prevents contamination of the bearing 110. The second end of the first rotating shaft member 10 has a clutch drum 112 in which a clutch 113 resides. The inside radius of the clutch drum 112 has a plurality of internal clutch discs splines 190.

The plurality of external splines 135 of the intermediate shaft of the second rotating shaft member 15 are sized and shaped to engage with a plurality of internal splines 145 on the inner surface of a bore 140 of the ramped plate 65. The external splines 135 engage splines 150 to allow the second rotating shaft member 15 and the ramped plate 65 to rotate in unison.

The clutch mechanism components generally resides within the clutch drum 112 of the first rotating shaft member 10. The clutch mechanism components include the clutch plate 70 which holds a first plurality of clutch discs 160 and a second plurality of clutch discs 165. The clutch plate 70 has a set of external clutch disc splines 205. The first plurality of clutch discs 160 and the second plurality of clutch discs 165 include a suitable friction material to generally inhibit the sliding of clutch discs 160 over the surfaces of clutch discs 165. The first plurality of clutch discs 165 are splined to the clutch drum 112 by a set of external splines matching the internal clutch disc splines 190 of the clutch drum. The second plurality of clutch discs 160 are splined to the clutch plate 70 by a set of internal splines matching the external clutch disc splines 205 of the clutch plate.

When the clutch discs 160 and 165 are not frictionally engaged, the clutch discs are held together loosely between a radially extending flange 155 having a first flat annular surface 170 and a second flat annular surface 180 on a clutch pressure plate 175. The second flat annular surface 180 has an outer radius 195 sized to provide clearance between the second flat annular surface 180 and the plurality of internal clutch plate splines 190 of the clutch drum 112. An inner radius 200 of the second flat annular surface 180 is sized to provide clearance between the second flat annular surface 180 and the clutch disc splines 205 of the clutch plate 70. A first annular ramped surface 172 is opposite the second flat annular surface 180 of the clutch pressure plate 175. A bore 178 of the clutch pressure plate 175 is sized to allow the clutch pressure plate to move axially along the ramped plate 65.

The ramped plate 65 has a second annular ramped surface 185. The second annular ramped surface 185 is complimentary to, and engageable with, the first ramped surface 172 of the clutch pressure plate 175. The ramped plate 65 and the clutch pressure plate 175 are connected in rotational direction by a spring 220. The spring 220 allows for a limited relative rotation between the ramped plate 65 and the clutch pressure plate 175. In one embodiment of the present invention, the ramped surfaces are flat and inclined, while in another embodiment, the ramped surfaces are waved. In yet another embodiment, friction can be minimized by using rollers in place of the ramped surfaces 185.

The torque control module A has a braking mechanism for slowing the rotation of the clutch pressure plate 175 in relation to the first rotating shaft member 10. The braking mechanism uses an electromagnetic field to induce drag on the clutch pressure plate 175. In one embodiment, the braking mechanism is an eddy current brake or a hysteresis brake. FIG. 1 shows another embodiment wherein the braking mechanism is an electromagnetic clutch 260.

The electromagnetic clutch brake 260 includes a magnetic ring 230, a solenoid coil 240, and at least two connectors 250. The magnetic ring 230 is attached to an outer surface 235 of the clutch pressure plate 175. The solenoid coil 240 is mounted on an inner surface 245 of the flanged housing 25. The solenoid coil 240 has at least two connection points 250 to allow for connection of the solenoid coil to electrical conductors capable of providing a current within the electrical wiring of the solenoid coil 240. The magnetic ring 230 and the solenoid coil 240 operate as a brake 260 to vary the relative rotation between the clutch pressure plate 175 and the ramped plate 65.

Figure 2:
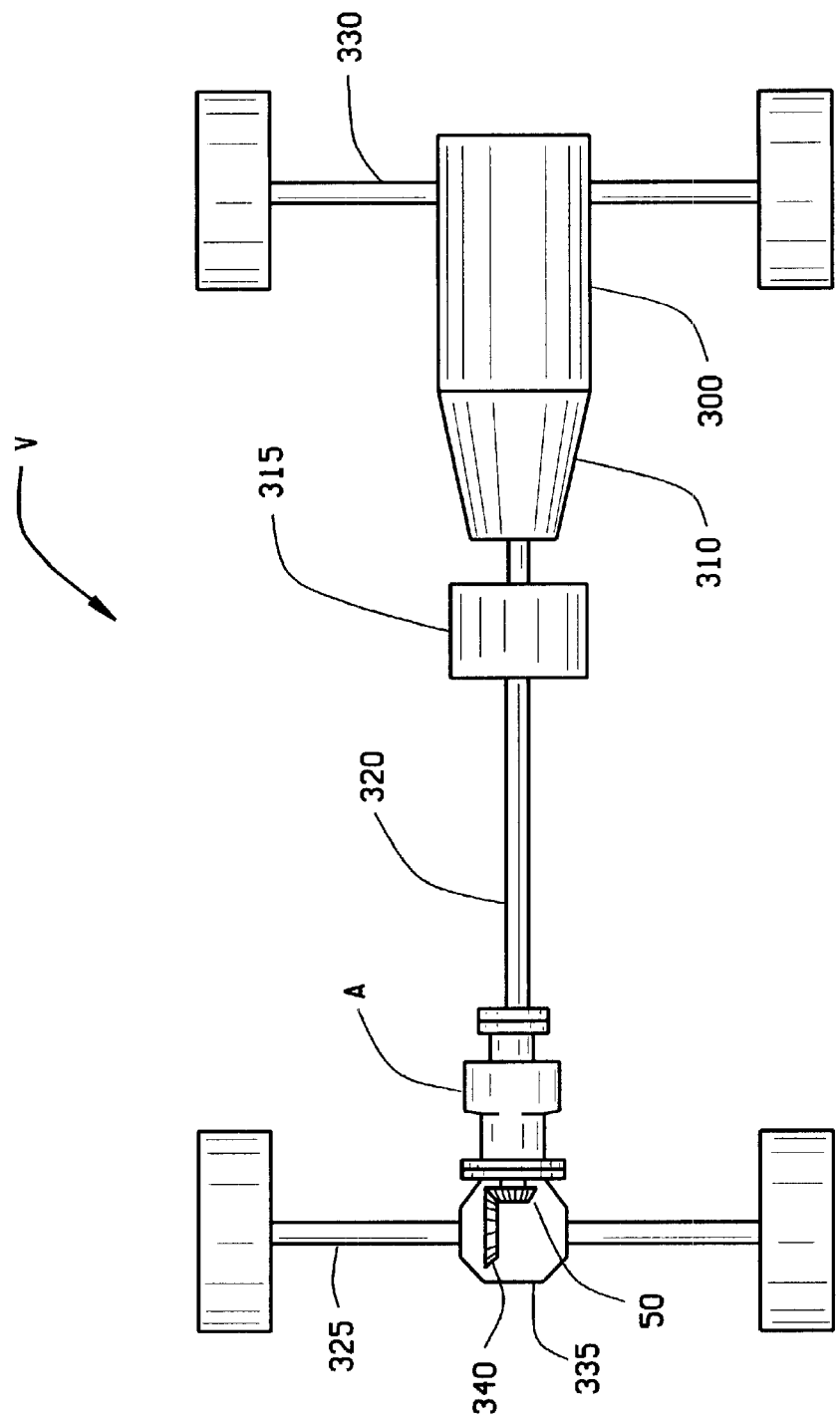
FIG. 2 is a schematic plan view showing one embodiment of the torque transfer module into an all wheel drive vehicle.

In operation, the torque transfer module A transfers torque between the first rotating shaft member 10 and the second rotating shaft member 15. Referring now to FIG. 2, in one embodiment of the present invention, an all wheel drive vehicle V has an engine 300, a transmission 310, and a transfer case 315. A drive shaft 320 extends from the transfer case 315 toward the rear axle 325 of the vehicle V. Another drive shaft (not shown) extends from the transfer case 315 toward the front axle 330 of the vehicle V. The rear axle 325 has a differential 335. The torque transfer module A is installed between the drive shaft 320 and the differential 335. The hypoid or bevel gear 50 of the second rotating shaft member 15 engages the ring gear 340 of the differential 335. The vehicle is equipped with a detection system capable of sensing differences between the front axle 330 and the rear axle 325 on the vehicle V. Antilock braking systems are commonly used to detect such rotational differences. Once such rotational differences are detected, or when the distribution of the torque between the front axle 330 and the rear axle 325 needs to be altered, signals from the detection system onboard the vehicle provide signals to the torque transfer module A which allows for a modulated activation of the braking mechanism such as an electromagnetic, hysteresis, or eddy current brake. The amount of rotation transferred between the first rotating shaft member 10 (FIG. 1) and the second rotating shaft member 15 is dependent on the drag created by the brake 260, and the drag on the brake 260 is determined by the strength of the signal sent to the brake 260 by the onboard detection system. The amount of compression of the clutch discs of the clutch 113 is in proportion to the drag created by the brake 260.

More specifically, when the brake 260 is not activated, the second rotating shaft member 15 freewheels in relation to the first rotating shaft member 10. Upon activation of the brake 260, drag on the clutch pressure plate 175 is created which tends to slow the rotation of the clutch pressure plate in relation to the rotation of the second rotating shaft member 15 and the ramped plate 65. The difference in the relative rotation of the clutch pressure plate 175 and the ramped plate 65 biases the second annular ramped surface 185 of the ramped plate 65 against the first annular ramped surface 172 of the clutch pressure plate 175. The pressure placed on the clutch pressure plate 175 compresses the first plurality of clutch discs 165 against the second plurality of clutch discs 160. Because all clutch discs include a suitable friction material, the rotation of the first plurality of clutch discs 165 is imparted to the second plurality of clutch discs 160. The rotation imparted to the second plurality of clutch discs 160 is transferred to the first rotating shaft member 10 which is connected to the first plurality of clutch discs 165 by the engagement of the internal splines of the second plurality of clutch discs 160 with the external splines 205 of the clutch plate 70.

The electrical current within the brake 260 can be varied to either increase or decrease the drag on the clutch pressure plate 175. Reduced drag will decrease the compression of the clutch plates 160 against the clutch plates 165 thereby reducing the frictional engagement of the clutch plates. The reduction in the frictional engagement of the clutch plates 160 and 165, in turn, reduce the tendency of the first rotating shaft member 10 to impart its rotation to the second rotating shaft member 15. Thus, by varying the electrical current to the brake 260, the amount of torque transferred from the first rotating shaft member 10 to the second rotating shaft member 15 can be controlled.

While the present invention indicates a transfer of torque from the first rotating shaft member 10 to the second rotating shaft member 15, it will be clear that the transfer could also work in an opposite manner, thereby transferring torque from the second rotating shaft member to the first rotating shaft member. Additionally, while the present embodiment of the invention described herein transfers torque between the axles of a vehicle, in another embodiment, the torque transfer module is used to transfer torque between two wheels on the same axle of the vehicle. In that embodiment, the torque transfer module is positioned on one axle of a vehicle and the torque is transferred from one wheel of the axle to the other wheel on the same axle.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A torque transfer module, comprising:
    a housing;
    a first rotating shaft member;
    a second rotating shaft member, the second rotating shaft member having a first end and a second end, the first end having a gear and the second end having a threaded portion
    an antifriction bearing mounted onto the second rotating shaft member near the first end of the second rotating shaft member;
    a clutch positioned between the first rotating shaft member and the second rotating shaft member;
    a clutch pressure plate having a first annular ramped surface;
    a ramped plate having a second annular ramped surface complimentary to, and being engageable with, the first annular ramped surface of the clutch pressure plate, wherein the clutch, the clutch pressure plate, and the ramped plate are fastened to the second rotating shaft member by being captivated between the antifriction bearing assembly and a nut installed onto the threaded portion of the second rotating shaft member such that an axial actuation force and a reaction force created by activation of the clutch are self-contained onto the second rotating shaft member and transmission of the axial actuation force and the reaction force to the housing is prevented.

2. The torque transfer module of claim 1 further comprising a braking mechanism to slow the rotation of the clutch pressure plate in relation to the second rotating shaft member.

3. The torque transfer module of claim 2 wherein the braking mechanism is a eddy current brake.

4. The torque transfer module of claim 2 wherein the braking mechanism is a hysteresis brake.

5. The torque transfer module of claim 4 wherein the hysteresis brake includes a solenoid coil and a magnetic ring, the solenoid coil being attached to the housing, and the magnetic ring being attached to the clutch pressure plate.

6. The torque transfer module of claim 4 wherein the magnetic pole arrangement of the hysteresis brake is capable of creating a small relative rotation between the clutch pressure plate and the ramped plate to engage the clutch pressure plate with the ramped plate by aligning alternating magnetic poles on the housing with the magnetic poles on thee clutch pressure plate.

7. The torque transfer module of claim 2 wherein the braking mechanism is an electromagnetic brake.

8. The torque transfer module of claim 1 or 2 wherein the clutch has a first plurality of clutch discs engaged to rotate with the first rotating shaft member and a second plurality of clutch discs engaged to rotate with the second rotating shaft member.

9. The torque transfer module of claim 8 wherein, the first plurality of clutch discs are interleaved within the second plurality of clutch discs.

10. The torque transfer module of claim 8 wherein the clutch pressure plate compresses the first plurality of clutch discs against the second plurality of clutch discs.

11. The torque transfer module of claim 8 wherein, the ramped plate is engaged to the second rotating shaft member.

12. The torque transfer module of claim 11 wherein the ramped plate is engaged with the second rotating shaft member by a series of splines.

13. The torque transfer module of claim 1 or 2 wherein the housing includes a circular flange with a plurality of holes for mounting the torque transfer module to a vehicle.

14. The torque transfer module of claim 1 or 2 further comprising a circular mounting flange attached to the first rotating shaft member, the circular mounting flange having a plurality of mounting holes.

15. The torque transfer module of claim 1 or 2 wherein the second rotating shaft member has a first end and a second end, the first end having a hypoid or bevel gear.

16. The torque transfer module of claim 15 wherein the second end of the second rotating shaft member is threaded.

17. The torque transfer module of claim 1 or 2 wherein the first rotating shaft member has a first end and a second end, the first end being threaded and the second end having a clutch drum with a plurality of clutch disc splines.

18. The torque transfer module of claim 17 wherein the clutch transfers rotation between the first rotating shaft member and the second rotating shaft member.

19. The torque transfer module of claim 18 wherein the clutch includes a first plurality of clutch discs having a set of splines, a second plurality of clutch discs having a set of splines, and a clutch plate having a set of clutch disc splines, the set of splines of the first plurality of clutch discs being sized and shaped to engage the set of clutch disc splines of the clutch drum, the set of splines of the first plurality of clutch discs being sized and shaped to engage the plurality of clutch disc splines of the clutch plate, the first plurality of clutch discs being interleaved with the second plurality of clutch discs, the first and second plurality of clutch discs including a suitable friction material to generally inhibit the sliding of the first plurality of clutch discs against the second plurality of clutch discs.

20. The torque transfer module of claim 19 further comprising a torsion spring located on the second rotating shaft member between the ramped plate and the clutch pressure plate, the torsion spring being capable of slightly rotating the clutch pressure plate when the clutch is not activated, the amount of rotation being such as to align a set of high point points on the ramped plate with a set of low points on the clutch pressure plate to eliminate any rotational interference between the ramped plate and the clutch pressure plate.

21. The torque transfer module of claim 20 further comprising two bearing seals located to prevent the interior of the housing from being contaminated with debris originating outside the housing.

22. The torque transfer module of claim 20 further comprising two bearing seals located to prevent the interior of the housing from being contaminated with debris originating outside the housing.

23. The torque transfer module of claim 20 further comprising two bearing seals located to prevent the interior of the housing from being contaminated with debris originating outside the housing.

24. The torque transfer module of claim 23 wherein the antifriction bearing includes a cup having integrated threads for attaching the bearing cup to the housing.

25. The torque transfer module of claim 23 wherein the antifriction bearing includes a cup having integrated threads for attaching the bearing cup to the housing.

26. The torque transfer module of claim 25 further wherein there is an absence of a thrust bearing in the bearing arrangement which support the first rotating shaft member and the second rotating shaft member.

27. The torque transfer module of claim 23 wherein the antifriction bearing includes a cup having integrated threads for attaching the bearing cup to the housing.

28. The torque transfer module of claim 25 further wherein there is an absence of a thrust bearing in the bearing arrangement which support the first rotating shaft member and the second rotating shaft member.

29. The torque transfer module of claim 25 further wherein there is an absence of a thrust bearing in the bearing arrangement which support the first rotating shaft member and the second rotating shaft member.

30. A torque transfer module, comprising:
   a housing having a flanged housing assembly and a clutch housing assembly;
   a first rotating shaft member having a first end and a second end, the first end being threaded and the second end having a clutch drum;
   a second rotating shaft member having a first end, a second end, and an intermediate shaft, the first end having one of either a hypoid or bevel gear, the second end being threaded, and the intermediate shaft having a set of external splines;
   an antifriction bearing mounted onto the second rotating shaft member near the first end of the second rotating shaft member;
   a clutch for transferring rotation between the first rotating shaft member and the second rotating shaft member, the clutch having a first plurality of clutch discs and a second plurality of clutch discs, the first plurality of clutch discs being interleaved with the second plurality of clutch discs;
   a clutch plate;
   a clutch pressure plate for compressing the first plurality of clutch discs against the second plurality of clutch discs, the clutch plate having a first annular ramped surface;
   a ramped plate having a second annular ramped surface complimentary to, and being engageable with, the first annular ramped surface of the clutch plate, wherein the clutch, the clutch pressure plate, and the ramped plate are fastened to the second rotating shaft member by being captivated between the antifriction bearing assembly and a nut installed onto the threaded portion of the second rotating shaft member such that an axial actuation force and a reaction force created by activation of the clutch are self-contained onto the second rotating shaft member and transmission of the axial actuation force and the reaction force to the housing is prevented; and
   a circular mounting flange having a bore sized to slidably fit over the second end of the first rotating shaft member, the circular mounting flange having a plurality of mounting holes axially parallel to the first rotating shaft member.

31. The torque transfer module of claim 30 further comprising a braking mechanism to slow the rotation of the clutch pressure plate in relation to the second rotating shaft member.

32. The torque transfer module of claim 31 wherein the braking mechanism is a eddy current brake.

33. The torque transfer module of claim 31 wherein the braking mechanism is a hysteresis brake.

34. The torque transfer module of claim 33 wherein the hysteresis brake includes a solenoid coil and a magnetic ring, the solenoid coil being attached to the housing, and the magnetic ring being attached to the clutch pressure plate.

35. The torque transfer module of claim 33 wherein the magnetic pole arrangement of the hysteresis brake is capable of creating a small relative rotation between the clutch pressure plate and the ramped plate to engage the clutch pressure plate with the ramped plate by aligning alternating magnetic poles on the housing with the magnetic poles on the clutch pressure plate.

36. The torque transfer module of claim 31 wherein the braking mechanism is an electromagnetic brake.

37. The torque transfer module of claim 36 further comprising a torsion spring located on the second rotating shaft member between the ramped plate and the clutch pressure plate, the torsion spring being capable of slightly rotating the clutch pressure plate when the clutch is not activated, the amount of rotation being such as to align a set of high point points on the ramped plate with a set of low points on the clutch pressure plate to eliminate any rotational interference between the ramped plate and the clutch pressure plate.

38. A torque transfer module, comprising:
a housing consisting of a flanged housing assembly and a clutch housing assembly, the flanged housing assembly having an annular flange with a plurality of mounting holes;
a first rotating shaft member having a first end and a second end, the first end having being threaded and the second end having a clutch drum with a plurality of internal clutch disc splines;
a second rotating shaft member having a first end, a second end, and an intermediate shaft, the first end having one of either a hypoid or bevel gear, the second end being threaded, and the intermediate shaft having a set of external splines;
an antifriction bearing mounted onto the second rotating shaft member near the first end of the second rotating shaft member;
a clutch for transferring rotation between the first rotating shaft member and the second rotating shaft member, the clutch having a first plurality of clutch discs with a set of internal splines, a second plurality of clutch discs having a set of external splines, and a clutch plate having a set of external clutch disc splines sized shaped to engage the set of internal splines of the first plurality of clutch discs, the set of external splines of the second plurality of clutch discs being sized and shaped to engage the plurality of internal clutch disc splines of the clutch drum, the first plurality of clutch discs being interleaved with the second plurality of clutch discs, the first and second plurality of clutch discs including a suitable friction material to generally inhibit the sliding of the first plurality of clutch discs against the second plurality of clutch discs;
a clutch pressure plate for compressing the first plurality of clutch discs against the second plurality of clutch discs, the clutch plate having a first annular ramped surface;
a ramped plate having a second annular ramped surface complimentary to, and being engageable with, the first annular ramped surface of the clutch plate, the ramped plate having a plurality of internal splines to engage the plurality of external splines on the intermediate shaft of the second rotating shaft member, where the clutch pressure plate will compress the first plurality of clutch discs against the second plurality of clutch discs when the difference in relative rotation between the first rotating shaft member and the second rotating shaft member biases the second annular ramped surface of the ramped plate against the first annular ramped surface of the clutch pressure plate, wherein the clutch, the clutch pressure plate, and the ramped plate are fastened to the second rotating shaft member by being captivated between the antifriction bearing assembly and a nut installed onto the threaded portion of the second rotating shaft member such that an axial actuation force and a reaction force created by activation of the clutch are self-contained onto the second rotating shaft member and transmission of the axial actuation force and the reaction force to the housing is prevented; and
a circular mounting flange having a bore sized to slidably fit over the second end of the first rotating shaft member, the circular mounting flange having a plurality of mounting holes axially parallel to the first rotating shaft member.

39. The torque transfer module of claim 38 further comprising a braking mechanism to slow the rotation of the clutch pressure plate in relation to the second rotating shaft member.

40. The torque transfer module of claim 39 wherein the braking mechanism is an eddy current brake.

41. The torque transfer module of claim 39 wherein the braking mechanism is a hysteresis brake.

42. The torque transfer module of claim 41 wherein the hysteresis brake includes a solenoid coil and a magnetic ring, the solenoid coil being attached to the housing, and the magnetic ring being attached to the clutch pressure plate.

43. The torque transfer module of claim 41 wherein the magnetic pole arrangement of the hysteresis brake is capable of creating a small relative rotation between the clutch pressure plate and the ramped plate to engage the clutch pressure plate with the ramped plate by aligning alternating magnetic poles on the housing with the magnetic poles on the clutch pressure plate.

44. The torque transfer module of claim 39 wherein the braking mechanism is an electromagnetic brake.

45. The torque transfer module of claim 44 further comprising a torsion spring located on the second rotating shaft member between the ramped plate and the clutch pressure plate, the torsion spring being capable of slightly rotating the clutch pressure plate when the clutch is not activated, the amount of rotation being such as to align a set of high point points on the ramped plate with a set of low points on the clutch pressure plate to eliminate any rotational interference between the ramped plate and the clutch pressure plate.

* * * * *